United States Patent [19]

Kawamura

[11] Patent Number: 4,523,059
[45] Date of Patent: Jun. 11, 1985

[54] POWER STORAGE SYSTEM FOR ELECTRIC RAILWAY

[75] Inventor: Toshimi Kawamura, Osaka, Japan

[73] Assignee: Mitsubishi Denki Kabushiki Kaisha, Japan

[21] Appl. No.: 419,519

[22] Filed: Sep. 17, 1982

[30] Foreign Application Priority Data

Sep. 25, 1981 [JP] Japan .................................. 56-152790

[51] Int. Cl.³ ............................................... B60L 9/00
[52] U.S. Cl. ..................................... 191/6; 290/4 R; 290/45; 322/4
[58] Field of Search .................... 191/2, 6, 14, 15, 16, 191/17, 20; 290/4 R, 4 A, 45; 318/161, 587; 322/4

[56] References Cited

U.S. PATENT DOCUMENTS

| | | | |
|---|---|---|---|
| 807,984 | 12/1905 | Adams | 191/20 |
| 1,318,755 | 10/1919 | Hellmund | 322/4 X |
| 2,009,103 | 7/1935 | Byles | 322/4 X |
| 2,741,731 | 4/1956 | Pestarini | 318/161 X |
| 3,541,409 | 11/1970 | Storsand | 322/4 X |
| 3,667,012 | 5/1972 | Kilgore | 318/161 |
| 3,858,674 | 1/1975 | Tabor | 318/161 X |
| 4,266,180 | 5/1981 | Juvan | 322/4 |
| 4,358,719 | 11/1982 | Currier et al. | 318/161 |

FOREIGN PATENT DOCUMENTS 821246 4/1981 U.S.S.R. .................... 191/6

OTHER PUBLICATIONS

"TOPICS: Flywheel-Type Electric Railway Line Power Storage System", JETRO, Feb. 1981, pp. 2-4.
"Flywheel Type Electric Railway Energy Saving Substation", N. Maruyama, Japanese Railway Engineering, vol. 21, No. 2, 1981, pp. 22-24.

Primary Examiner—Robert B. Reeves
Assistant Examiner—David F. Hubbuch
Attorney, Agent, or Firm—Leydig, Voit, Osann, Mayer and Holt, Ltd.

[57] ABSTRACT

This invention relates to a power storage system for electric railway which comprises a motor-generator connected to a power system for feeding an electric vehicle with electric power, and a flywheel coupled to the motor-generator, and in which the motor-generator is allowed to store the electric power and thereafter discharge it in correspondence with approach of the electric vehicle to a predetermined running section and running thereof in the section.

3 Claims, 5 Drawing Figures

TO 164

POWER STORAGE SYSTEM FOR ELECTRIC RAILWAY

BACKGROUND OF THE INVENTION

This invention relates to a power storage system for electric railway which is connected to a power system for supplying the electric vehicles of the electric railway with electric power and in which a motor-generator and a flywheel are coupled.

Regarding the installation of the system of the type specified above, as illustrated in FIG. 1, there have heretofore been proposed (a) a case where a power storage apparatus 3a for electric vehicles is located along, with or near a power substation 2A, which is indicated as a substation for rectifying commercial A.C. power into D.C. power, (b) a case where a power storage apparatus 3b is located midway between a power substation 2A and a power substation 2B, and (c) a case where, instead of a power substation 2B, a power storage apparatus 3c is located, at the tail end of an overhead trolley line 1 which constitutes the power system. Actually, measures intermediate between the cases (a), (b) and (c) and arrangements with the cases combined are also performed. The power storage apparatus is constructed of a motor-generator 4, and a fly wheel 5 and a controller 6 which are coupled to the motor-generator. Numeral 7 designates an electric vehicle or train which is running.

Electric cars controlled by, e.g., choppers have been widely used in recent years to the end of reducing power consumption in the electric vehicles, and they have the feature of being capable of power regeneration during braking. The operation of the power storage apparatus of the specified type is sometimes intended for the storage of the regenerative power, and sometimes for the so-called "peak cut" for relieving the influence of high power on the substation, the high power being usually required during the starting or acceleration of the electric vehicles. These modes can be selected by controlling the motor-generator. Anyway, the reduction of losses attributed to the operation of the power storage apparatus is a technical problem, and various solutions have been studied and proposed. The conventional methods of reducing the losses, however, are still countermeasures on the power storage apparatus itself.

More specifically, the losses attendant upon the rotation of the flywheel 5 are principally a loss ascribable to frictional resistance with the ambient air and a loss ascribable to the friction of contact between the flywheel body and a lubricant or metal in a bearing suspending the former. In order to lighten the losses, according to the countermeasures, the apparatus is de-aerated into vacuum, and the bearing is made small in size so as to reduce the bearing loss, the insufficient component of the load capacity of the bearing being supported by a magnetic bearing or the like which causes no loss. Enhancing the performance of the flywheel 5 itself can also be deemed an important measure for the loss reduction. All the above proposals, however, are technical measures within the power storage apparatus itself. It is the present situation that any attempt to reduce the losses from the viewpoints of the operation of the power storage apparatus and the service of the electric railway has not been proposed yet.

SUMMARY OF THE INVENTION

It is accordingly an object of this invention to provide a power storage system for electric railway in which losses occurring in a power storage system with the running of electric vehicles can be effectively reduced in addition to minimizing the losses of the apparatus itself by the known measures, and all the losses occuring within a predetermined period can be reduced.

Another object of this invention is to provide a power storage system for electric railway in which the storage of electric power is started upon sensing the approach of an electric vehicle in a specified spot, and the electric power can be discharged when needed by the electric vehicle.

A further object of this invention is to provide a power storage system for electric railway in which the storage and discharge of electric power are performed by selecting specified times or specified time zones in correspondence with a train timetable.

In order to accomplish the above-mentioned objects, this invention realizes a power storage system for electric railway in which the period of time of high rotating speed is made as short as possible, with note taken of the fact that, in general, the losses of an apparatus which stores energy machanically by rotating increase as the rotating speed rises and decrease as it lowers.

BRIEF DESCRIPTION OF THE DRAWINGS

In the drawings, the same symbols indicate the same or corresponding parts.

DESCRIPTION OF THE PREFERRED EMBODIMENTS

Figure 2:
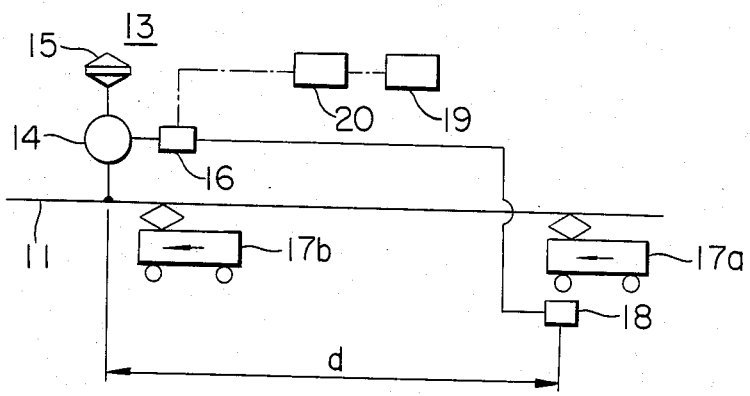
FIG. 2 is an explanatory diagram showing an embodiment of this invention.

Hereunder, this invention will be described in conjunction with an embodiment in FIG. 2. A power storage apparatus 13, which is installed at a proper point of an overhead trolley line 11, is constructed of a motor-generator 14, a flywheel 15 and a controller 16 likewise to the conventional one. An electric vehicle detector 18 is disposed at the entrance end of a running section which is set at a distance d from the power storage apparatus 13 along the overhead trolley line 11. Symbol 17a denotes an electric vehicle (train) which is approaching the power storage apparatus 13, while symbol 17b denotes an electric vehicle which has arrived near the power storage apparatus 13 and lies in a spot where it is fed with power from the power storage apparatus 13. The power is stored in the power storage apparatus 13 immediately before the electric vehicle 17b demands the power. Moreover, a margin of time is required to the extent of minimizing the burden of power transmission network. Accordingly, the electric vehicle detector 18 is disposed for the function of controlling the power storage apparatus 13 by a signal which corresponds to the proper distance on the running of the electric vehicle. More specifically, the power storage apparatus 13 is controlled by the controller 16 on the basis of the signal from the electric vehicle detector 18 so that the power storage may be started at the time at which the electric vehicle 17a has passed through the spot of the electric vehicle detector 18 and that the power may be discharged and fed to the electric vehicle when the spot 17b has been reached.

Figure 4:
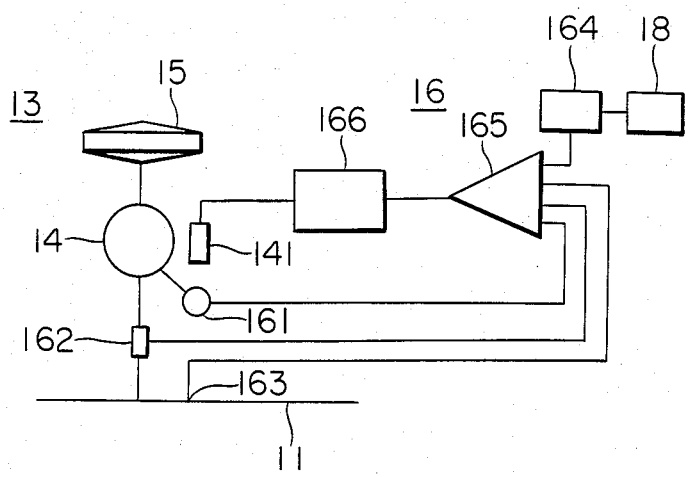
FIG. 4 is a diagram for explaining the control of a power storage apparatus which employs an electric vehicle sensor, the control being applicable to the embodiment shown in FIG. 2.

In this regard, reference is had to FIG. 4. The output signal of the electric vehicle detector 18 is transmitted to a reference voltage generator 164 of the controller 16. An arithmetic unit 165 receives a reference voltage from the generator 164, a voltage signal 163 and a current signal 162 of the overhead trolley line 11, and an output signal from a tachometer generator 161. A calculated output from the arithmetic unit 165 is transmitted to a thyristor device 166, which controls the excitation of a field winding 141 of the motor-generator 14.

In this manner, the power storage apparatus 13 can store the necessary power at need, so that losses arising within the body of the power storage apparatus 13 can be suppressed to the minimum.

Figure 1:
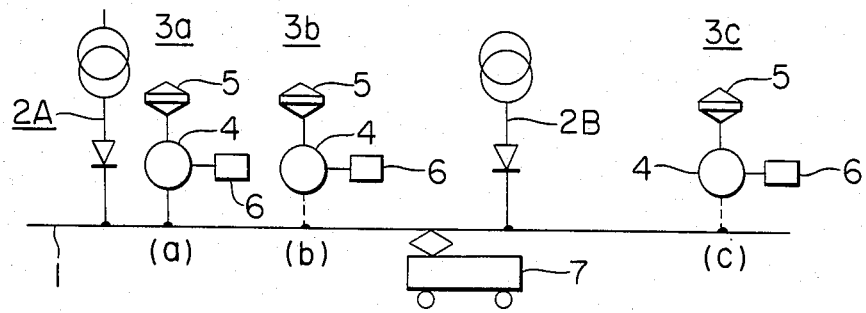
FIG. 1 is an explanatory diagram showing the arrangements of prior-art power storage systems for electric railway.
Figure 3:
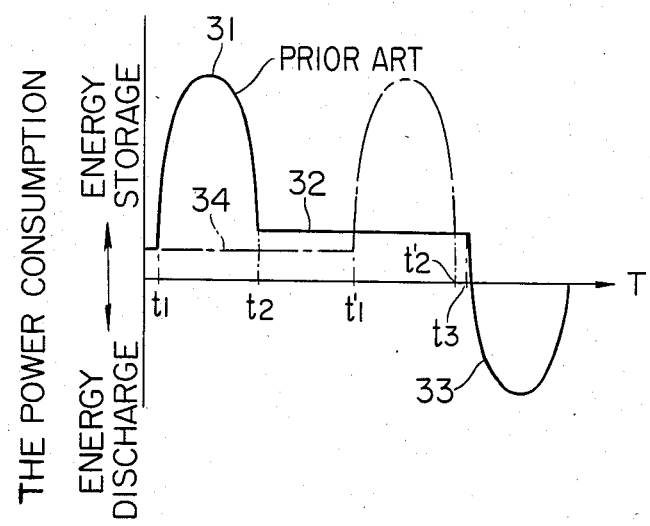
FIG. 3 is a diagram showing the operating waveforms of a power storage apparatus.

On the other hand, in the prior-art systems of FIG. 1 in which the positional information of the electric vehicle is not taken into account, only the overhead trolley line voltage and the overhead trolley line current become inputs for control signals. Therefore, the time at which the line voltage is high is judged to be the time at which electric vehicles run infrequently, and the power storage apparatus is always caused to stand by with the maximum storage capacity, namely, at the highest rotating speed. This will be explained with reference to FIG. 3. In the figure, the axis of ordinates represents the power consumption (energy storage - energy discharge), while the axis of abscissas the time. As indicated by a curve 31 in FIG. 3, power is stored considerably earlier than the approach of the electric vehicle, so that the loss of the apparatus becomes great as indicated by a straight line 32. In contrast, when the positional information of the electric vehicle is properly obtained, the storage of power is started at need, and the power is discharged and consumed immediately after the power storage as indicated by a curve 33, so that the loss becomes as indicated by a straight line 34, and the loss amount of the whole system can be reduced considerably. More specifically, when the overhead trolley line voltage has risen in case of infrequent train running, the power storage starts at a time $t_1$. Even if the power storage has ended at a time $t_2$, the electric vehicle will not always come. Supposing $t_3$ to be the time at which the power is actually needed, the power is held stored during the period from $t_2$ to $t_3$ Since the power storage apparatus is constructed of a rotary machine, the mechanical loss in the meantime is great. In order to diminish the loss, the period $t_2$–$t_3$ must be shortened. By way of example, the time at which the power storing operation starts is set at $t'_1$ in order that a time corresponding to the time $t_2$ may become $t'_2$ which is immediately before the time $t_3$. Then, during the period $t_1$–$t'_1$ which precedes the completion of the power storage, the flywheel constituting the power storage apparatus is in the state of low speed, so that the mechanical loss of the rotary machine is low. To the end of finding the time $t'_1$, the foregoing embodiment detects the position of the electric vehicle by means of the electric vehicle detector 18.

Further, the service of electric vehicles conforms with a predetermined timetable. Therefore, the timetable is stored in a computer 19, and a power storage command signal is provided using an operating time command unit 20 which is determined in consideration of economy in advance. Thus, the overall efficiency of the power storage apparatus 13 can be enhanced more. The optimum power storage quantity can also be given by adding the function of sorting the electric vehicles.

Figure 5:
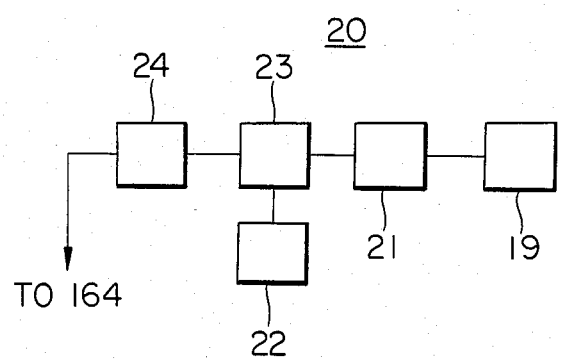
FIG. 5 is a diagram for explaining the control of a power storage apparatus based on the timetable of electric vehicles, the control being applicable to the embodiment shown in FIG. 2.

FIG. 5 shows the arrangement of the operating time command unit 20 for executing the above operation. The content of the timetable of the electric vehicles is stored in the computer 19. A reading unit 21 reads a time and the kind of a train, e.g., special express, express or ordinary, in a predetermined running section, and it transmits the read signals. An arithmetic unit 23 performs calculations on the basis of the above signals and a time signal from a clock 22, and provides an output concerning the power storing time and the power discharging time. The output is converted by a converter 24 into a control signal, which is applied to the controller 16.

The foregoing embodiment operating as the control means of the motor-generator has been explained principally on the betterment of the efficiency thereof. Most power storage apparatuses in practical use have the tendency that the internal loss increases more as the quantity of power storage becomes larger. Regarding this control, a technique similar to the foregoing is applicable and is greatly effective.

Avoiding the wasteful storage of power results in avoiding the useless consumption of energy. Moreover, a large quantity of power storage, in general, results in increasing stress inside the apparatus. In this regard, the invention does not raise the stress inside the apparatus. Accordingly, it is also effective to lighten the maintenance operations of the apparatus and to prolong the lifetime thereof.

Furthermore, in this invention, when the capacity the power storage apparatus is made sufficiently large, power substation can be replaced with the apparatus. Even in a spot where no power transmission line exists, by properly storing power from an overhead trolley line into the apparatus, this apparatus operates as if a power station exists there. Especially in a route of low train density, therefore, the apparatus can be always used as the power substation.

As described above in detail, according to this invention, train information is introduced into the control of storing and discharging electric power. Therefore, the overall efficiency is improved without storing the electric power wastefully, and the energy-saving effect is enhanced more. In addition, the invention can achieve excellent effects in points of maintenance and lifetime.

What is claimed is:

1. A power storage system for electric railways having sections comprising a motor-generator connected to a power system for feeding an electric vehicle running in said sections with electric power, a flywheel coupled to said motor-generator, and means including a controller having information on the position of said vehicle in said sections for controlling said motor-generator based on the position information to increase the speed of said flywheel and store power and immediately thereafter to discharge power stored in said flywheel by driving said motor-generator in correspondence with arrival of the electric vehicle at a predetermined running section and running thereof in the section.

2. A power system for electric railways comprising a motor-generator connected to a power system including an overhead trolley line for feeding an electric vehicle with electric power, a flywheel coupled to said motor-generator, an electric vehicle detector disposed along said overhead trolley line for detecting arrival of the electric vehicle at a predetermined running section, and means including a controller connected to receive positional information from said detector for controlling said motor-generator to increase the speed of said flywheel and store power and thereafter to discharge power stored in said flywheel by driving said motor-generator in correspondence with approach of the electric vehicle to the predetermined running section and running thereof in the section.

3. A power storage system for electric railways comprising a motor-generator connected to a power system for feeding an electric vehicle with electric power, a flywheel coupled to said motor-generator, and means including a controller having positional information as to said vehicle for controlling said motor-generator to increase the speed of said flywheel and store power and thereafter discharge power stored in said flywheel by driving said motor-generator in correspondence with the arrival of the electric vehicle at a predetermined running section and running thereof in the section, said positional information being based on a timetable of the electric vehicle.

* * * * *